United States Patent [19]

Oka et al.

[11] Patent Number: 4,658,236
[45] Date of Patent: Apr. 14, 1987

[54] AUTOMATIC SIGNAL CANCELLING APPARATUS FOR A DIRECTION INDICATOR ON MOTORCYCLE OR THE LIKE VEHICLE

[75] Inventors: Tsumoru Oka; Hiroshi Tamagawa, both of Miyagi, Japan

[73] Assignee: Alps Electric Co., Ltd., Japan

[21] Appl. No.: 655,362

[22] Filed: Sep. 27, 1984

[30] Foreign Application Priority Data

Sep. 28, 1983 [JP] Japan ................. 58-148820

[51] Int. Cl.$^4$ ............................... B60Q 1/40
[52] U.S. Cl. ....................... 340/56; 340/73; 340/74; 340/134
[58] Field of Search ............... 340/56, 55, 54, 66, 340/110, 73, 81 R, 81 F, 52 R, 84, 87, 114 R, 114 B, 321, 134

[56] References Cited

U.S. PATENT DOCUMENTS 2,918,566 12/1959 Lunsford ..................... 340/87
4,323,877 4/1982 Morita et al. ................ 340/56
4,403,211 9/1983 Shibata et al. ............... 340/56

FOREIGN PATENT DOCUMENTS 0107933 5/1982 Japan ....................... 340/56

Primary Examiner—John W. Cladwell, Sr.
Assistant Examiner—Mahmoud Fatahi-yar
Attorney, Agent, or Firm—Guy W. Shoup

[57] ABSTRACT

A compact automatic signal cancelling apparatus for a direction indicator mounted on a motorcycle, engine driven bicycle or like vehicle is housed in a cylindrical member which is fixedly secured to the handlebar. A variable resistor is incorporated in the apparatus for detecting an angle of turning movement of the handlebar and its rotary shaft is connected to the body or frame of the motorcycle which serves as a reference point for the apparatus. As the handlebar is turned by the driver on the motorcycle, the apparatus in the cylindrical member is rotated while the rotary shaft of the variable resistor is kept immobable. The angle of turning movement of the handlebar is detected by the change in resistance value of the variable resistor, which is transmitted to a control circuit. The control circuit automatically turns on or off the signal on the direction indicator in response to detection of the change in resisting value of the variable resistance.

4 Claims, 7 Drawing Figures

AUTOMATIC SIGNAL CANCELLING APPARATUS FOR A DIRECTION INDICATOR ON MOTORCYCLE OR THE LIKE VEHICLE

BACKGROUND OF THE INVENTION

1. Field of the Invention

The present invention relates to an automatic signal cancelling apparatus for a direction indicator mounted on a motorcycle, engine driven bicycle or like vehicle, and more particularly to improvement of or relating to an automatic signal cancelling apparatus for a direction indicator particularly on a motorcycle or like vehicle.

2. Description of the Prior Art

Several tpyes of automatic signal cancelling apparatus usable for the above-mentioned purpose have been proposed and put in practical use. However, it has been pointed out with respect to the conventional apparatuses that they are complicated in structure and therefore they are manufactured at an expensive cost. Another problem of the conventional apparatuses is that there occur often mechanical and/or electrical problems because of their complicated structure.

SUMMARY OF THE INVENTION

Thus, the present invention has been made with the foregoing background in mind.

It is an object of the invention to provide an improved automatic signal cancelling apparatus for a direction indicator mounted on a motorcycle, engine driven bicycle or the like which is simple in structure.

It is other object of the invention to provide an improved automatic signal cancelling apparatus for a direction indicator mounted on a motorcycle, engine driven bicycle or the like which can be manufactured at an inexpensive cost.

It is another object of the invention to provide an improved automatic signal cancelling apparatus for a direction indicator mounted on a motorcycle, engine driven bicycle or the like which assures that there occurs very few problems.

It is still another object of the invention to provide an improved automatic signal cancelling apparatus for a direction indicator mounted on a motorcycle, engine driven bicycle or the like which has long durability.

To accomplish the above objects there is proposed according to the invention an automatic signal cancelling apparatus for a direction indicator particularly on a motorcycle or like vehicle essentially comprising a detecting means for detecting an angle of turning movement of a handlebar 1, one part of the detecting means being fixedly secured to the handlebar 1 and the other part of the same being connected to a part of the body or frame of the motorcycle which serves as a reference point relative to turning movement of the handlebar 1, a printed board with a control circuit section mounted thereon for cancelling a signal on the direction indicator in response to an output signal transmitted from the detecting means, and a holding sleeve for housing the detecting means and the printed board to hold them therein.

In a preferred embodiment of the invention a variable resistor is employed as a means for detecting an angle of turning movement of the handlebar 1. A rotary shaft of the variable resistor is connected to the body or frame of the motorcycle by way of a connecting lever or like means, whereas the housing of the variable resistor is fixedly connected to the handlebar 1 by way of the holding sleeve and a cylindrical member.

As the handlebar 1 is turned by a driver on the motorcycle, the apparatus is caused to rotate while the rotary shaft of the variable resistor is kept immovable. Thus, the rotary shaft of the variable resistor is rotated relative to the housing of the latter, that is, the handlebar 1. Change in resistance value of the variable resistor is transmitted to the control circuit section on the printed board so as to turn on or off the signal on the direction indicator.

An encoder may be employed as another means for detecting an angle of turning movement of the handlebar 1.

Other objects, features and advantages of the invention will become more clearly apparent from the following description which has been prepared in conjunction with the accompanying drawings.

BRIEF DESCRIPTION OF THE DRAWINGS

The accompanying drawings will be briefly described below.

Figure 2:
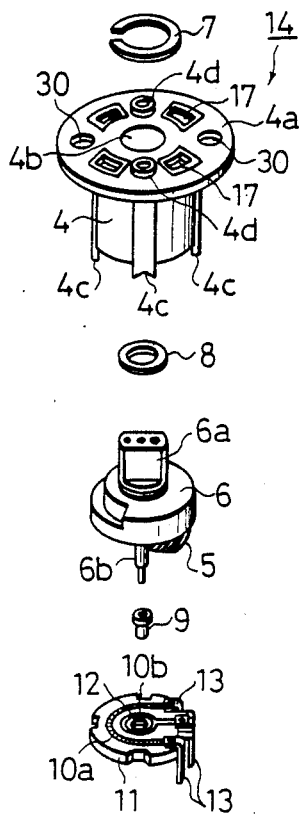
FIG. 2 is a perspective view of a detecting means for detecting an angle of turning movement of the handlebar, shown in the disassembled state.
Figure 3:
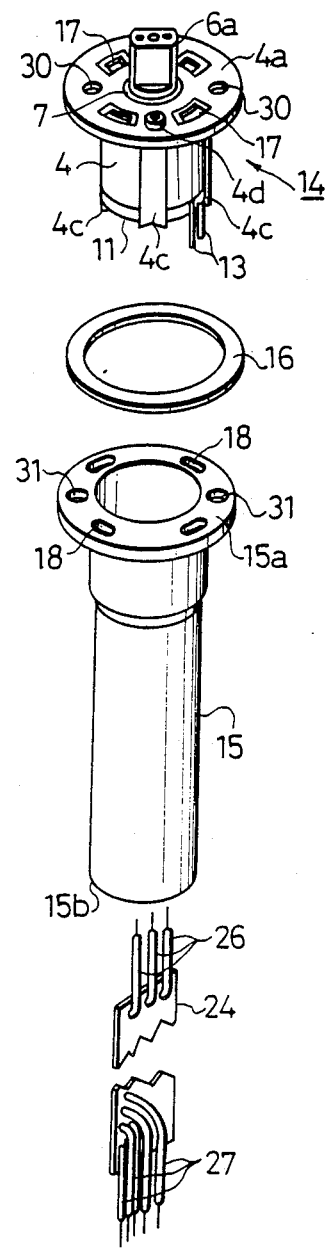
FIG. 3 is a perspective view of the automatic signal cancelling apparatus in FIG. 1, shown in the disassembled state.

It should be noted that components in FIGS. 2 and 3 are shown upside down.

DESCRIPTION OF THE PREFERRED EMBODIMENTS

The present invention will be described in greater detail hereunder with reference to the accompanying drawings which illustrate a preferred embodiment thereof.

Figure 1:
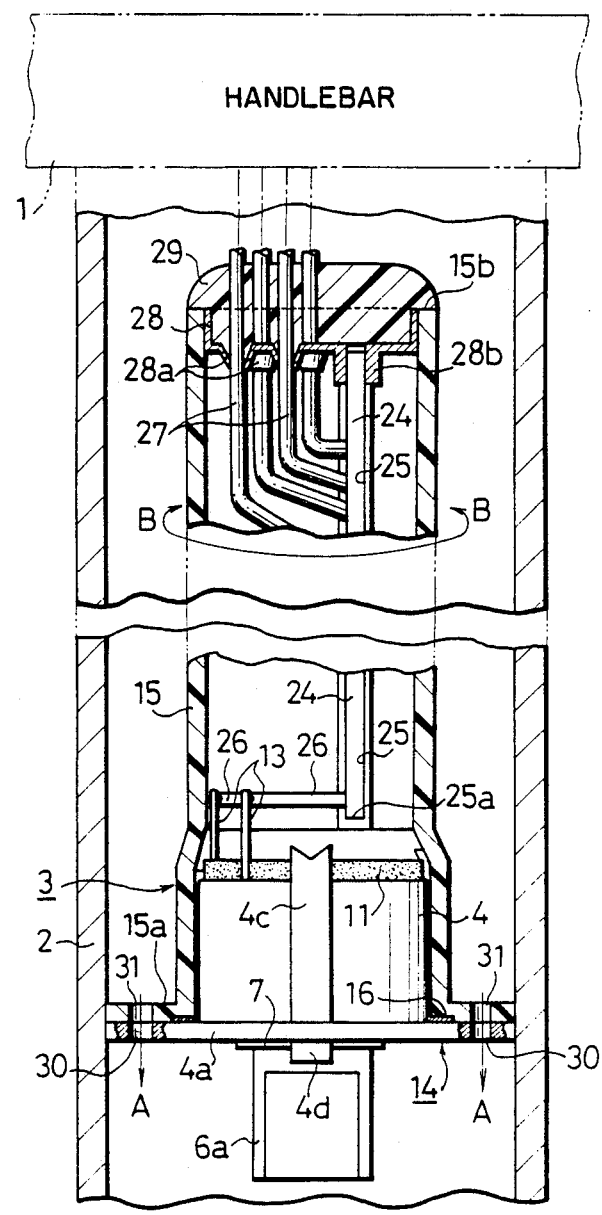
FIG. 1 is a vertical sectional view of an automatic signal cancelling apparatus in accordance with an embodiment thereof, wherein the apparatus is housed in a cylindrical member and the handlebar is identified by phantom lines.

Referring first to FIG. 1, a handlebar on a motorcycle as identified by chain lines is made integral with a cylindrical member 2 so that it turns together with the latter. An automatic signal cancelling apparatus 3 for automatically cancelling (extinguishing) a signal on a conventional direction indicator (not shown) is incorporated within the cylindrical member 2 at a predetermined position.

Next, description will be made as to the structure and function of the automatic signal cancelling apparatus 3 (hereinafter referred to as apparatus 3). As is apparent from FIG. 2, a bushing 4 with a flange $4_a$ integrally formed on the outer surface thereof has a through hole $4_b$ vertically extending along the central axis. The bushing 4 is preferably made of zinc alloy which is diecast to the configuration of the bushing 4. A rotary shaft $6_a$ on a slider holder 6 is rotatably inserted into the central through hole $4_a$ with a water seal packing 8 being fitted on the rotary shaft $6_a$. In the assembled state as illustrated in FIGS. 1 and 2 the rotary shaft $6_a$ projects outwardly of the bushing 4 by a certain distance. In the drawings reference numeral 7 designates a small ring for inhibiting the slider holder 6 from being disconnected. Thus, the slider holder 6 is held rotatable in the bushing 4 without occurrence of disconnection from the latter. As is best seen in FIG. 2, a slider 5 is fixedly attached to the slider holder 6 by thermal fusion or the like method.

The slider holder 6 includes a shaft portion $6_b$ extending in the opposite direction to the rotary shaft $6_a$ and the shaft portion $6_b$ is inserted into a small hole 12 on the base plate 11 with a bearing bushing 9 made of polyamide resin or like material being disposed therebetween. The base plate 11 is made of a composite material such as glass-epoxy resin or the like and includes a ring-shaped resistor $10_b$ and a ringshaped collector $10_b$ spaced away from one another on the surface located opposite to the slider 5. Further, three terminals 13 are attached to the base plate 11 at the predetermined position as illustrated in FIG. 2 by caulking operation. The base plate 11 is firmly engaged to the bushing 4 with the aid of a plurality of engagement pawls $4_c$ which are project outwardly from one end of the side wall of the bushing 4. Thus, a variable resistor 14 is constituted by a combination of the bushing 4, the slider 5, the slider holder 6 and the base plate 11.

The variable resistor 14 is housed in a holding sleeve 15 made of synthetic resin with a water seal packing 16 disposed therebetween in such a manner that the flange $4_a$ of the bushing 4 (constituting the variable resistor 14) is placed on the flange $15_a$ of the holding sleeve 15. As is apparent from FIG. 3, the flange $15_a$ is formed with a plurality of raised portions 18 equally spaced from one another in the circumferential direction, whereas the flange $4_a$ is formed with a plurality of rectangular holes 17 at positions corresponding to that of the raised portions 18 on the flange $15_a$. Thus, the variable resistor 14 is fixedly held in the holding sleeve 15 by way of fitting the raised portions 18 into the rectangular holes 17 and welding the foremost end part of the raised portions 18 to the flange $4_a$ by thermal fusion.

Figure 4:
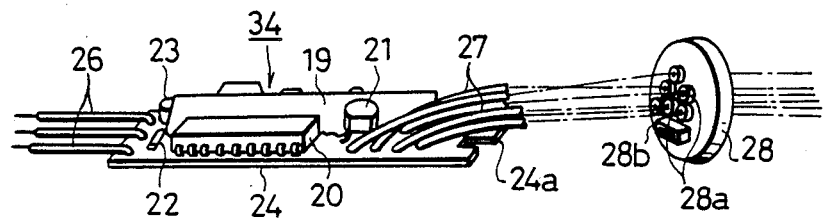
FIG. 4 is a perspective view of a printed board with a control circuit section mounted thereon as well as its associated components, shown in the disassembled state.
Figure 5:
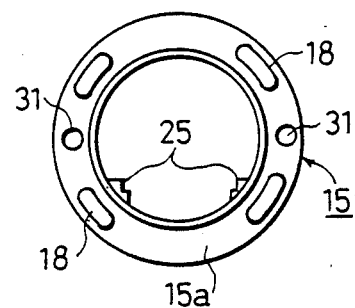
FIG. 5 is a bottom view of a holding sleeve in which main components of the apparatus are housed.

Further, a printed board 24 with hybrid IC 19, LSI 20, regulator 21, resistor 22 and condensor 23 mounted thereon as illustrated in FIG. 4 is housed in the holding sleeve 15. To this end the holding sleeve 15 has a pair of guide grooves 25 formed on the inner wall at the position as illustrated in FIG. 5 whereby the printed board 24 is immovably held at the predetermined position in the holding sleeve 15 by fitting the printed board 24 into the guide grooves 25. As illustrated in FIG. 1, a stopper $25_a$ is provided at one end of each of the guide grooves 25 but the other end of the latter is opened free toward the upper open end $15_b$ of the holding sleeve 15.

Figure 6:
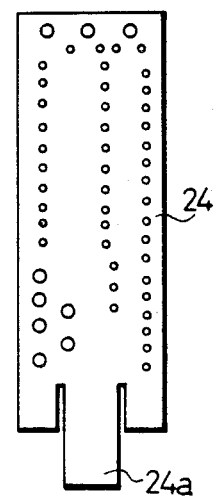
FIG. 6 is a plan view of the printed board.

Three lead wires 26 extend from the lower end of the printed board 24 (the upper end of the same as seen in FIG. 3), are connected to the terminals 13 on the variable resistor 14 by soldering. Further, six lead wires 27 extend from the upper end of the printed board 24 (the lower end of the same as seen in FIG. 3) and they are brought to the outside of the upper open end $15_b$ of the holding sleeve 15 through a cover 28 made of synthetic resin. As illustrated in FIGS. 1 and 4, the cover 28 is formed with six conically walled holes $28_a$ at the position as illustrated in the drawings so that the lead wires 27 are firmly held by allowing them to extend through the holes $28_a$. Further, the cover 28 has a raised portion $28_b$ with a rectangular hole formed therein so that a projected portion $24_a$ from the one end of the printed board 24 (see FIGS. 4 and 6) is fitted into the rectangular hole in the raised portion $28_b$. Thus, by inserting the printed board 24 through the guide grooves 25 on the holding sleeve 15 and fitting the projected portion $24_a$ at the one end of the printed board 24 into the rectangular hole in the raised portion $28_b$ of the cover 28, both the printed board 24 and the cover 28 are firmly held in the holding sleeve 15 without any possibility of their being rotated. Moreover, there is no fear of causing the lead wires 27 to be twisted or entangled with one another. After the cover 28 is fitted into the upper open end $15_b$ of the holding sleeve 15 to close the latter therewith, the fitting area of both the cover 28 and the upper open end part $15_b$ is watertightly sealed by depositing synthetic resin based or rubber based adhesive 29 on the fitting area.

As sohwn in FIGS. 1 and 3, the flange $4_a$ of the bushing 4 and the flange $15_a$ of the holding sleeve 15 have water drainage holes 30 and 31 formed thereon in such a manner that the water drainage holes 30 are located in vertical alignment with the water drainage holes 31 when the raised portions 18 of the holding sleeve 15 are fitted into the rectangular holes 17 of the bushing 4. From the viewpoint of inhibiting the apparatus 3 from rattling in the cylindrical member 2 (assuring stability of the apparatus 3 in the latter) the outer diameter of the flanges $4_a$ and $15_a$ is dimensioned substantially the same as the inner diameter of the cylindrical member 2 whereby there is a very tight clearance between the flanges $4_a$ and $15_a$ and the inner wall of the cylindrical member 2. In the assembled structure as described above, rain water or the like will accumulate on the flanges $4_a$, $15_a$ and gradually penetrate into the apparatus 3, if no water drainage holes are provided on the flanges $4_a$ and $15_a$. On the other hand, since the flanges $4_a$ and $15_a$ are formed with water drainage holes 30 and 31 as illustrated in the drawings, water is drained through them in the direction as identified by arrow marks A in FIG. 1. Thus, no trouble occurs due to pentration of water into the apparatus.

Figure 7:
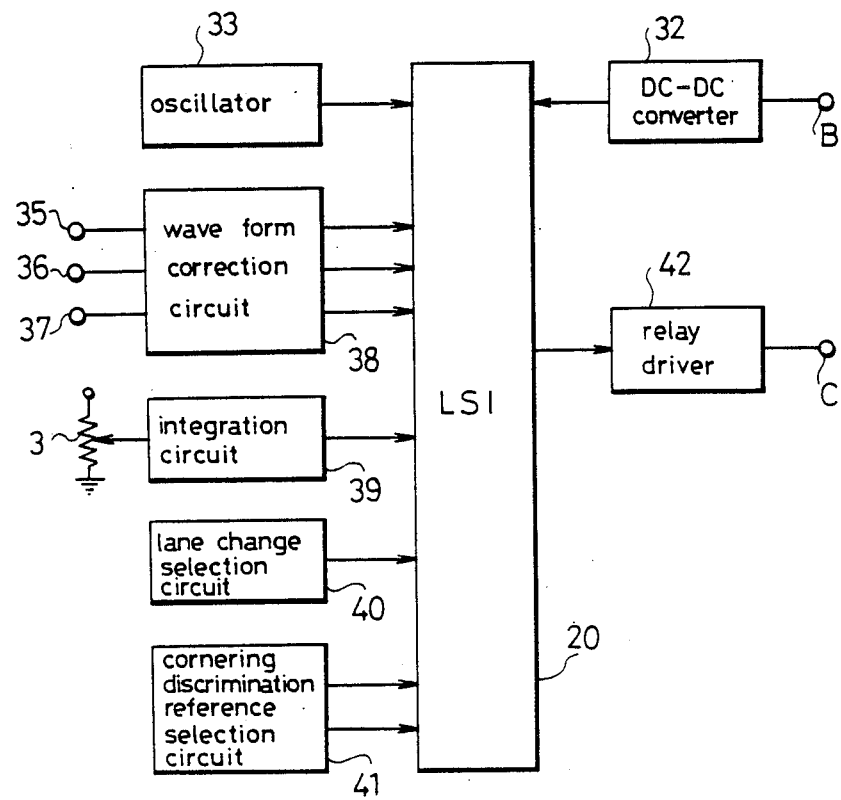
FIG. 7 is a block diagram schematically illustrating the structure of the control circuit section.

FIG. 7 is a block diagram illustrating the structure of a control section 34 for the apparatus 3. A power source B having an intensity of 12V is electrically connected to LSI 20 via DC - DC converter 32. Further, LSI 20 has an oscillator 33 connected thereto, and a winker switch 35, a rest switch 36 and a speed pulse generator 37 are electrically connected to LSI 20 via a wave form correction circuit 38 respectively. The apparatus 3 is electrically connected to LSI 20 via an integration circuit 39, and moreover a lane change selection circuit 40 and a cornering discrimination reference selection circuit 41 are electrically connected to LSI 20 respectively. Further, an arrangement is made such that a signal is outputted from LSI 20 to a relay driver 42.

The apparatus is inserted into the cylindrical member 2 in such a posture that the rotary shaft $6_a$ extends downwardly as illustrated in FIG. 1 and thereafter tapping screws (not shown) are driven through two bosses $4_d$ projected downwardly of the flange $4_a$. As a result the part of the apparatus 3 located adjacent to the holding sleeve 15 (the base plate 11) is fixedly joined to the cylindrical member 2 so that the handlebar 1 can be rotated together with the former in the direction as identified by arrow marks B in FIG. 1. A connecting lever (not shown) extending from the body of a motorcycle is operatively connected to the rotary shaft $6_a$. Accordingly, as the handlebar 1 is turned by a driver, the holder sleeve 15 (adjacent to the base plate 11) is caused to rotate relative to the slider 5 whereby an angle of turning of the handlebar 1 is detected in the form of change in resisting value of the variable resistor 14.

A method of automatically cancelling a signal on a direction indicator will be described below with respect to a typical example.

The variable resistor 14 is constructed such that a resisting value corresponding to the extent of turning of the handlebar 1 by 25 degrees in both the leftward and rightward directions relative to the normal position of the handlebar during forward running is divided into 256 segments. Prior to turning to the required direction the switch for the direction indicator is turned on by a driver. After completion of turning movement of the motorcycle the handlebar 1 is restored to the normal position. At this moment a return angle of the handlebar 1 is detected by the variable resistor and then the fact that the normal position of the handlebar 1 for forward running has been resumed is discriminated by the control section 34. Thus, the signal on the direction indicator can be cancelled (extinguished) in accordance with an output signal C from the control section 34.

In the above-described embodiment of the invention a variable resistor is employed as the means for detecting an angle of turning of the handlebar but the invention should not be limited only to this. Alternatively, other device such as encoder or the like may be used.

As described above, the apparatus of the invention essentially comprises a detecting means for detecting an angle of turning of the handlebar, one part of the detecting means being fixedly connected to the handlebar and the other part of the same being operatively connected to a part of the body of the motorcycle which serves as a reference point relative to the turning movement of the handlebar, a printed board with a control circuit section mounted thereon for cancelling a signal on the direction indicator in response to a signal outputted from the detecting means, and a holding sleeve for housing the detecting means and the printed board to hold them therein.

According to the invention the detecting means and the printed board with the control circuit section mounted thereon are housed and held in a single holding sleeve, and therefore there does not occur malfunction such as generation of noise or the like due to excessive extension of the lead wires. An advantageous feature of the invention is that the apparatus is simple in structure and can be easily assembled on the body of a motorcycle. Another advantageous feature of the invention is that the apparatus is easy to be maintained.

While the present invention has been described above only with a single preferred embodiment, it should of cource be understood that it should not be limited only to this but various changes or modifications may be made in any acceptable manner without departure from the spirit and scope of the invention as defined in the appended claims.

What is claimed is:

1. In an automatic signal cancelling apparatus for a direction indicator on a motorcycle or the like vehicle, of the type having detecting means for detecting an angle of turning between one part fixedly connected to a handlebar and another part connected to the body of the vehicle which serves as a reference relative to a turning movement of the handlebar, said detecting means including means for providing a signal indicative of the angle of relative turning movement and a control circuit mounted on a printed circuit board for providing a cancelling signal to the direction indicator in response to said turning angle signal, the improvement comprising a single holding sleeve enclosing said detecting means including said signal providing means and said printed circuit board, said holding sleeve being mounted vertically within said one part fixedly connected to the handlebar and having one open end thereof facing downwardly from which a member of said detecting means extends and is connected to said other part connected to the body of the vehicle, said holding sleeve having a laterally extending flange at said one open end for mounting to said one part, a bushing covering said one open end and mating with said flange, and a seal positioned between said flange and said bushing to form a watertight seal for said one open end of said holding sleeve.

2. An automatic signal cancelling apparatus for a direction indicator on a motorcycle or like vehicle as defined in claim 1, wherein the detecting means comprises a variable resistor.

3. An automatic signal cancelling apparatus for a direction indicator on a motorcycle or like vehicle as defined in claim 1, wherein an angle of turning movement of the handlebar is detected in the form of a change in resistance value of the variable resistor and said change in resistance value is transmitted to the control circuit to turn on or off the signal on the direction indicator.

4. The automatic signal cancelling apparatus of claim 1, further comprising means forming water drainage holes through said flange and said bushing positioned outwardly from said one open end of said holding sleeve for draining water collected between said holding sleeve and said one part connected to the handlebar.

* * * * *